United States Patent Office 3,454,501
Patented July 8, 1969

3,454,501
ALDONIC ACID AND ALDONATE COMPOSITIONS AND PRODUCTION THEREOF
Jack Ziffer, Milwaukee, Arthur S. Gaffney, Waukesha, Simon Rothenberg, Shorewood, and Thomas J. Cairney, Milwaukee, Wis., assignors to Pabst Brewing Company, Milwaukee, Wis., a corporation of Delaware
No Drawing. Filed Feb. 12, 1965, Ser. No. 432,378
Int. Cl. C11d 7/08, 7/12; C09k 3/00
U.S. Cl. 252—142
6 Claims

ABSTRACT OF THE DISCLOSURE

A liquid composition is prepared consisting essentially of a mixture of gluconic acid and gluconate in water containing 50% to 90% by weight dissolved solids and a weight ratio of gluconic acid to gluconate in an amount sufficient to enhance stability and in the range of 0.06:1 to 44:1, preferably 0.2:1 to 4:1. A fermentation process is used in preparing the products.

---

This invention relates to aldonic acids and aldonates and more particularly to new gluconic acid and gluconate compositions which exhibit highly desirable properties, and processes for the production of these compositions.

Gluconic acid is usually made commercially from glucose either by chemical oxidation or by fermentation processes. The free acid is usually sold as a 50% by weight solution in water. The salts such as sodium gluconate or ammonium gluconate are sold as solids but are dissolved in water before use in processing operations. The present invention is concerned with a fermentation process for making gluconic acid and gluconates, and especially with a process for preparing new and useful liquid mixtures of gluconic acid and gluconates.

The value of gluconic acid and gluconates in commerce is well known, as are the various gluconic acid and gluconate products adapted for these uses and processes for obtaining them. However, the available products and processes suffer from disadvantages which are desirably overcome. One important problem concerns the economical fermentation production of high concentrations of gluconic acid and gluconates. Another problem is the difficulty of processing concentrated solutions of gluconic acid salts. Still another problem is the preparation of stable concentrated gluconate liquid compositions. A further problem is the economical conversion of gluconates to gluconic acid.

It is therefore an object of this invention to provide an economical process for the submerged culture fermentation production of high concentrations of gluconic acid and gluconates.

Another object is to provide a simple and reliable procedure for processing concentrated solutions of gluconates.

An additional object is to provide for the production of stable concentrated gluconic acid and gluconate liquid compositions.

A further object is to provide an economical process for the conversion of gluconates to gluconic acid.

Other objects include the simple, reliable and economical production of gluconic acid and gluconates of a high degree of purity. These and other objects and advantages of the invention will be apparent upon reference to the following description.

In accordance with one embodiment of the invention, new and useful methods have been discovered for conducting the gluconic acid submerged culture fermentation in concentrated medium solutions, such medium solutions containing glucose, or its equivalent as hydrolyzed starches, dextrins, syrups and the like, in concentrations far in excess of those previously known in the art. For example, the prior art refers to medium solutions containing up to 40% glucose, with the preferred range being considerably less than this concentration. In this invention, it is routine to ferment and convert fermentation medium solutions to which have been added in excess of 40% glucose with the preferred addition being the equivalent of approximately 50–75% glucose, and to obtain an end product, as for example sodium gluconate or its equivalent, in desirable concentrations in excess of 60% in the final medium solution. Although high glucose concentrations, particularly in the 50–75% range, are not readily fermented, it has been found in the practice of this invention that increased concentrations of glucose can be readily utilized and converted to gluconic acid if the fermentation medium is prepared with a portion of the glucose and the remainder of the glucose added later during the fermentation process. In other words, the glucose is added in increments or aliquots. For example, it has been found that complete fermentation and conversion to gluconic acid can be obtained by initially fermenting a nutrient solution containing approximately 28% glucose and subsequently adding and fermenting approximately 30% additional glucose. Likewise, glucose combinations of approximately 27%, 30%, 8% and 9%; 34% and 26%; 42% and 21%; 41%, 15% and 10%; and the like can be readily employed. Alternatively, the glucose can be intermittently added in smaller aliquots. One additional advantage of this process is that it is only necessary to sterilize the initial fermentation glucose medium as the subsequent portions of glucose can be added without sterilization, resulting in an operating economy. Further, the advantageous use of non-sterilized glucose results in a desirably lighter colored fermentation medium and, subsequently, in a desirably lighter colored end product.

During at least the initial course of the fermentation, a base, for example sodium hydroxide, potassium hydroxide, ammonium hydroxide, or the like, is added to the fermentation medium to neutralize the gluconic acid being produced. Although the prior art emphasizes the importance of completely neutralizing all of the gluconic acid as it is formed, it has been found that this is not a requirement of the present process as herein described and that it is usually desirable not to completely neutralize all the gluconic acid formed. While the acid neutralization can be continued until the fermentation is completed and all of the glucose has been converted to gluconic acid, it is one of the features of this invention that the neutralization of the gluconic acid be continued only until the organism has produced substantially optimum amounts of cell growth and glucose oxidase, which enzyme is involved in the oxidation of glucose to gluconic acid. At approximately this point, the neutralization of the gluconic acid being produced is stopped, and the fermentation continued without neutralization until substantially all of the glucose added is converted to gluconic acid.

Alternatively, the neutralization of the gluconic acid being produced can be stopped at an earlier period or at a later period. For example, in one embodiment of the invention, the neutralization of the gluconic acid is stopped after approximately 28% glucose has been converted to acid, and the fermentation is then continued as an additional 30% glucose is added and converted to acid without any further neutralization. As another alternative, the neutralization of the gluconic acid can be stopped at another point, as for example after approximately 42% glucose has been converted to acid, and the fermentation then continued as an additional 21% glucose is added and converted to acid without any further neutralization. Thus, the percentage of gluconic acid and neutralized gluconates produced in the fermentation can be readily varied depending on the requirements of the process as later described.

This process advantageously results in compositions of mixtures of substantial amounts of gluconic acid and neutralized gluconate salt, such processes and compositions having many desirable features. For example, the neutralization of only a portion of the gluconic acid produced during the fermentation results in a considerable economy of base used, when the resultant composition is used as such. In addition, the reduced amount of base used desirably results in decreased total solution solids, a feature technically important in achieving optimum agitation-aeration conditions during the fermentation. Further, the reduced amount of base used desirably results in decreased solution viscosities, a feature technically important during the recovery processing operation.

When the fermentation is carried out for the production of completely neutralized sodium gluconate, the salt is present in the final whole culture medium in excess of its solubility level. Thus, it is necessary to heat the whole culture to redissolve the sodium gluconate prior to the filtration operation and to keep the mixture warm during this operation. The solution solubility of sodium gluconate becomes even more critical during the subsequent handling and concentration procedure prior to the crystallization and drying operations, when there is increased danger of the concentrated supersaturated sodium gluconate solution crystallizing out and solidifying in the transfer lines and processing equipment. While this inherent danger can usually be avoided by keeping the concentrated supersaturated sodium gluconate solution hot and by processing the solution as rapidly as possible, these conditions are not always completely possible or economical. In addition, it is desirable not to heat the sodium gluconate solution unnecessarily as heating increases the color of the solution and subsequently the color of the end product. Further, residual sodium gluconate crystalline seed in a transfer line may cause a concentrated supersaturated solution subsequently passing through the line to prematurely crystallize out and solidify. It is evident that these and other similar technical problems are desirably overcome.

It is an important feature of this invention that these and similar technical problems are readily and simply corrected. For example, in accordance with one embodiment of the invention desirable compositions of mixtures of gluconic acid and neutralized gluconates can be produced, as for example neutralized sodium gluconate, in the final medium in the ratio of approximately 0.5–3 parts gluconic acid to 1 part neutralized sodium gluconate. These compositions and similar other compositions are unique in that they are readily soluble over a wide range of concentrations, concentrations in excess of the levels at which neutralized sodium gluconate solutions would quickly crystallize and solidify. Thus, in accordance with this invention, it is possible to concentrate the composition to the desired high levels without any danger of crystallization or solidification. Further, the soluble concentrated solution can be safely and conveniently transferred to the dryer feed tank where it is completely neutralized with sodium hydroxide or similar base and the product recovered by drying as known to the art. Alternatively, the final processed fermentation medium filtrate can be transferred directly to the dryer feed tank without any further concentration, where it is completely neutralized and recovered by drying. In this manner, it is possible in accordance with this invention to obtain a sodium gluconate dry product of 96–98% purity with a very advantageous operating economy. If desired, the soluble concentrated solution can be easily and routinely transferred to the crystallizer tank where it is completely neutralized with sodium hydroxide or similar base, the crystallization allowed to proceed and the sodium gluconate crystals recovered and dried as known to the art. In this manner, it is possible in accordance with the invention to obtain a sodium gluconate dry product of 100% purity. These process improvements thus advantageously result in a very desirable versatility and operating economy.

Except for gluconic acid, the only commercially available liquid composition, the salts of gluconic acid are produced on large scale only as dry solid products. One reason for this is the relative poor solubility of the gluconates. For many technical purposes, however, it would be very desirable to have other liquid products available as such preparations readily lend themselves to large scale operation. Unfortunately, it is difficult to prepare and maintain such liquid concentrate products from gluconates. It is therefore one of the objects of this invention to provide for the preparation of stable gluconic acid and gluconate liquid concentrate compositions which can readily be used in place of the unstable concentrated gluconate solutions. It is a further object of this invention to provide compositions having solubility properties and other advantages which are useful and desirable, especially when compared to the commercially available liquid gluconic acid product, an important use of which is for the preparation of alkaline formulations. For example, the gluconic acid and gluconate liquid compositions require less base than the gluconic acid product for the preparation of alkaline formulations. In addition, one of the disadvantages of the liquid gluconic acid product is that it is produced only as a 50% by weight composition which should be stored at temperatures above 7° C. (45° F.) to prevent crystallization. Further, when the liquid gluconic acid product is prepared at desired higher concentrations, the danger of crystallization is markedly increased.

These are disadvantages that are desirably overcome and it has been discovered that this can be easily and economically accomplished using compositions of gluconic acid and gluconates or their equivalent. For example, it has been found that liquid compositions such as gluconic acid plus sodium gluconate, gluconic acid plus potassium gluconate, gluconic acid plus ammonium gluconate, gluconic acid plus sodium gluconate plus ammonium gluconate, gluconic acid plus sodium gluconate plus potassium gluconate plus ammonium gluconate, and the like can be prepared in high concentration, as for example as high as approximately 50–90% by weight or its equivalent, with the desired stability and solubility properties. In addition to producing these compositions by direct formulation, it has been found that, as previously described, one can very advantageously produce the compositions directly in the fermentation, or, alternatively, produce one form of the composition directly in the fermentation and subsequently modify it by direct formulation.

One additional advantage of this invention is in regard to the economical production of gluconic acid. In the prior art processes for the production of this product, the procedures include the neutralization of the reaction mixture or fermentation medium with calcium base or the like, for the important technical function of precipitating the acid as its insoluble salt. Such a procedure, however, requires the subsequent relatively expensive chemical conversion of the recovered insoluble salt to free gluconic acid by acidification with sulfuric acid. Further, the necessary use of large amounts of calcium base to completely neutralize the gluconic acid makes it very difficult to recover the acid by any other procedure. It has been discovered that an embodiment of this invention, whereby the fermentation is carried out using a minimum amount of base, for example sodium hydroxide, to partially neutralize the gluconic acid, lends itself to the relatively inexpensive recovery of gluconic acid from the final fermentation mixture. For example, the sodium cation present in a typical final fermentation mixture containing approximately 2 parts gluconic acid and 1 part sodium gluconate can be conveniently removed by ion exchange resin treatment, dialysis, electrodialysis, etc. This method for the production of gluconic acid has the further advantage in that it can be carried out directly using the final processed fermentation filtrate, eliminating the need for expensive precipitation and conversion procedures. In this manner, it is possible in accordance with this invention to obtain a gluconic acid product of 98–100% purity with a very advantageous operating economy.

The following examples are illustrative of the methods and compositions according to the invention. It is to be understood that the invention is not limited to the examples nor to the particular materials, proportions, conditions and procedures set forth therein. All percentages here are on a weight:volume basis unless otherwise indicated. For example, 40% means 40 grams per 100 milliliters of total solution.

Example I (a) A nutrient medium was prepared from the following materials:

| | Grams |
|---|---|
| Corn meal | 10 |
| Dextrose monohydrate | 20 |
| Corn steep liquor | 50 |
| Water to 1000 ml. | |

After adjusting the mixture to pH 7.0–7.2 with sodium hydroxide, 5 grams of calcium carbonate were added. A slant culture of the gluconic acid-producing organism *Aspergillus niger*, N.R.R.L.3 was used to inoculate a number of 250 ml. Erlenmeyer flasks, each containing a mixture of 5 grams of wheat bran and 5 ml. of the above medium, the mixture previously sterilized for 30–45 minutes at 121° C. These flasks were incubated at 28° C. for 5–15 days until good growth and sporulation were obtained.

(b) A nutrient medium was prepared from the following materials:

| | Pounds |
|---|---|
| Dextrose monohydrate | 50 |
| Corn steep liquor | 3.33 |
| $MgSO_4 \cdot 7H_2O$ | 0.17 |
| $KH_2PO_4$ | 0.17 |
| $(NH_4)_2HPO_4$ | 0.33 |
| Urea | 0.08 |
| Water to 100 gallons. | |

After adjusting the pH to approximately 4.5 with sulfuric acid, the mixture was sterilized with steam for 30 minutes at 121° C. and cooled to 33° C. The medium was then adjusted to pH 6.3–6.6 with sterile sodium hydroxide solution and inoculated with one flask of the inoculum prepared in (a) above slurried in 2 liters of sterile water. The organism was then cultivated at 33° C. under submerged conditions of aeration for a period of approximately 15–22 hours.

(c) A nutrient medium was prepared from the following materials:

| | Pounds |
|---|---|
| Dextrose [1] | As indicated |
| Corn steep liquor | 3.33 |
| $MgSO_4 \cdot 7H_2O$ | 0.17 |
| $KH_2PO_4$ | 0.17 |
| $(NH_4)_2HPO_4$ | 0.33 |
| Urea | 0.08 |
| Water to 100 gallons. | |

[1] Commercial dextrose monohydrate was used. For clarity, values are recalculated as pure dextrose and the amounts used are indicated in the individual examples.

After adjusting the pH to approximately 4.5 with sulfuric acid, the mixture was sterilized with steam for 30 minutes at 121° C. and cooled to 33° C. The medium was then adjusted to pH 6.4–6.8 with sterile sodium hydroxide solution and inoculated with 10 gallons (10%) of the inoculum prepared as described in (b) above. The organism was then cultviated at 33° C. under submerged conditions of aeration and agitation for the indicated period of hours, as shown in the individual examples.

(d) The data shown in the following Table I are for a series of runs carried out with varying glucose concentrations and the fermentation medium pH controlled in the approximate range of 6.2–6.6 by the automatic addition of sterile 50% by weight sodium hydroxide solution. As indicated by the data, the glucose in the 28% and 42% runs was essentially completely utilized with excellent conversion to gluconic acid. Increasing the percent glucose in the medium, especially to 63%, resulted in slower utilization rates.

TABLE I

| Run | A | B | C |
|---|---|---|---|
| Initial percent glucose | 27.7 | 42.0 | 63.1 |
| pH control | Yes | Yes | Yes |
| Fermentation time, hours | 23 | 48.5 | [1] 71 |
| Percent residual glucose | 0.23 | 0.07 | 36.9 |
| Avg. glucose utilization, percent/hr | 1.22 | 0.85 | 0.4 |
| Final pH | 7.0 | 7.0 | 6.4 |
| Percent sodium gluconate [2] | 27.4 | 40.2 | 19.4 |
| Percent conversion from glucose | 94.3 | 94.3 | 28.2 |

[1] Not complete. [2] Assayed by polarimeter.

(e) To illustrate the importance of initial pH control in this fermentation, an identical run (41.5% glucose) was carried out except that the medium pH was not controlled and sodium hydroxide was not added. As indicated by the data in the following Table II, only about 25% of the glucose was utilized and only a portion of this was converted to gluconic acid, despite the fact that the mycelium solids value indicated that better than normal fungal growth had ben obtained.

TABLE II

| | |
|---|---|
| Initial glucose percent | 41.5 |
| pH control | No |
| pH after (hours): | |
| 0 | 6.5 |
| 6 | 5.75 |
| 8 | 4.2 |
| 11 | 3.25 |
| 15 | 2.75 |
| 23 | 2.65 |
| 30 | 2.5 |
| 51 | 2.5 |
| Fermentation time (not complete) hours | 51 |
| Mycelium solids percent | 0.38 |
| Residual glucose do | 31.0 |
| Gluconic acid [1] do | 2.4 |

[1] Titration value calculated as gluconic acid.

Example 2

The procedures of Example 1 were repeated using a medium containing 27.4% glucose and the pH maintained at 6.4 by the automatic addition of 50% by weight sodium hydroxide. After the completion of the fermentation (cycle No. 1), additional glucose (non-sterile) was added to the medium so that the concentration was 30.1% and the fermentation continued with the pH maintained as before. After the completion of the fermentation (cycle No. 2), additional glucose (non-sterile) was again added to the medium so that the glucose concentration was 7.8% and the fermentation continued as before. After the completion of the fermentation (cycle No. 3) additional glucose (non-sterile) was again added to the medium so that the glucose concentration was 8.7% and the fermentation continued as before. The data for these fermentation cycles are shown in the following Table III. As indicated by these data, essentially complete utilization and excellent conversion of the glucose to sodium gluconate was achieved, with the final sodium gluconate concentration being 68.2%. Considerable crystallization occurred in the fermentation medium at these high sodium gluconate levels and by the end of fermentation cycle No. 4, the precipitated sodium gluconate occupied approximately 40% of the final medium volume on settling. It was necessary to heat the final medium to approximately 70°–80° C. to redissolve the precipitated gluconate, and to hold the medium at this temperature range during the filtration operation. A clear filtrate was obtained in this manner; however, the sodium gluconate quickly reprecipitated as soon as the filtrate temperature dropped appreciably.

TABLE III

| Fermentation Cycles | 1 | 2 | 3 | 4 |
|---|---|---|---|---|
| Initial percent glucose | 27.4 | 30.1 | 7.8 | 8.7 |
| pH control | Yes | Yes | Yes | Yes |
| Fermentation time, hours | 26 | 20 | 13 | 38 |
| Percent residual glucose | 0.0 | 0.05 | 0.0 | 0.65 |
| Final pH | 6.4 | 6.4 | 6.4 | 7.0 |
| Percent sodium gluconate [1] | 26.4 | 52.2 | 58.0 | 68.2 |
| Percent conversion from glucose | 93.2 | 95.4 | 98.6 | 98.0 |

[1] Assayed by polarimeter.

Example 3

The procedures of Example 2 were repeated using a medium containing 40.9% glucose and the medium pH maintained at 6.6 with 50% by weight sodium hydroxide. After the completion of the fermentation (cycle No. 1), additional glucose (non-sterile) was added to the medium so that the concentration of glucose was 15.2% and the fermentation continued without the addition of any base. After the completion of the fermentation (cycle No. 2), additional glucose (non-sterile) was again added to the medium so that the concentration of glucose was 9.9% and the fermentation continued without the addition of any base. The data for these fermentation cycles are shown in the following Table IV. As indicated by these data, essentially complete utilization and excellent conversion of the glucose to gluconic acid and sodium gluconate was achieved, with the final yield, calculated as sodium gluconate equivalent, being 62.1%. The final fermentation medium contained the gluconic acid and sodium gluconate completely in solution, and was processed by filtration at room temperature to give a clear light colored filtrate which remained clear on standing.

TABLE IV

| Fermentation Cycles | 1 | 2 | 3 |
|---|---|---|---|
| Initial percent glucose | 40.9 | 15.2 | 9.9 |
| pH control | Yes | No | No |
| Fermentation time, hours | 45 | 12 | 15 |
| Percent residual glucose | 0.14 | 0.47 | 0.00 |
| Final pH | 6.6 | 4.0 | 3.8 |
| Percent sodium gluconate equivalent [1] | 39.1 | 53.2 | 62.1 |
| Percent gluconic acid [2] | 0.0 | 16.2 | 25.8 |
| Ratio gluconic acid: sodium gluconate | | 0.46 | 0.77 |
| Percent conversion from glucose | 96.1 | 99.0 | 100 |

[1] Neutralized sample assayed by polarimeter.
[2] Titration value calculated as gluconic acid.

Example 4

(a) The fermentation cycle procedures of Example 3 were repeated for a series of 2-cycle runs whereby the initial fermentation cycle was maintained at pH 6.4 by the addition of sodium hydroxide and the subsequent fermentation cycle was carried out without the addition of any base. The initial fermentation medium in each run contained approximately 42% glucose; however, the addition of sodium hydroxide in the individual runs was discontinued at different times so as to vary the amount of gluconic acid produced in the fermentations. As shown by the data in the following Tables V, VI, VII, and VIII, the sodium hydroxide addition was stopped after approximately 42%, 37%, 33%, and 26% glucose had been utilized in the respective runs. In each case, the same amount of glucose (non-sterile) was then added to each medium and the fermentations continued without the addition of any base. As indicated by the data, essentially complete utilization and excellent conversion of the glucose to gluconic acid and sodium gluconate was achieved, with the yields, calculated as sodium gluconate equivalent, being 60.8%, 61.1%, 62.4%, and 60.2%, respectively. The decreasing amounts of sodium hydroxide used in these runs shifted the gluconic acid:sodium gluconate weight ratio so that values of 0.70, 0.96, 1.28, and 2.41 were obtained, respectively. The final fermentation medium in each case contained the gluconic acid and sodium gluconate completely in solution and was processed by filtration at room temperature to give a clear light colored filtrate which remained clear on standing.

TABLE V

| Fermentation Cycles | 1 | 2 |
|---|---|---|
| Initial percent glucose | 42.0 | 21.3 |
| pH control | Yes | No |
| Fermentation time, hours | 48.5 | 23 |
| Percent residual glucose | 0.07 | 0.0 |
| Final pH | 6.4 | 3.7 |
| Percent sodium gluconate equivalent [1] | 40.2 | 60.8 |
| Percent gluconic acid [2] | 0.0 | 23.9 |
| Ratio gluconic acid: sodium gluconate | | 0.70 |
| Percent conversion from glucose | 94.4 | 100 |

[1] Neutralized sample assayed by polarimeter.
[2] Titration value calculated as gluconic acid.

TABLE VI

| Fermentation Cycles | 1 | 2 |
|---|---|---|
| Initial percent glucose | 42.0–5.1 | 25.7 |
| pH control | Yes | No |
| Fermentation time, hours | 46.5 | 26 |
| Percent residual glucose | 5.1 | 0.0 |
| Final pH | 6.4 | 3.5 |
| Percent sodium gluconate equivalent [1] | 35.1 | 64.1 |
| Percent gluconic acid [2] | 0.0 | 2.85 |
| Ratio gluconic acid: sodium gluconate | | 0.96 |
| Percent conversion from glucose | 95.5 | 97.8 |

[1] Neutralized sample assayed by polarimeter.
[2] Titration value calculated as gluconic acid.

TABLE VII

| Fermentation Cycles | 1 | 2 |
|---|---|---|
| Initial percent glucose | 42.0–9.0 | 28.5 |
| pH control | Yes | No |
| Fermentation time, hours | 42.5 | 33.5 |
| Percent residual glucose | 9.0 | 0.02 |
| Final pH | 6.4 | 3.55 |
| Percent sodium gluconate equivalent [1] | 30.0 | 62.4 |
| Percent gluconic acid [2] | 0.0 | 3.29 |
| Ratio gluconic acid: sodium gluconate | | 1.28 |
| Percent conversion from glucose | 92.2 | 97.0 |

[1] Neutralized sample assayed by polarimeter.
[2] Titration value calculated as gluconic acid.

TABLE VIII

| Fermentation Cycles | 1 | 2 |
|---|---|---|
| Initial percent glucose | 41.2–14.8 | 34.1 |
| pH control | Yes | No |
| Fermentation time, hours | 29.3 | 68 |
| Percent residual glucose | 14.8 | 0.02 |
| Final pH | 6.4 | 3.2 |
| Percent sodium gluconate equivalent [1] | 22.0 | 60.2 |
| Percent gluconic acid [2] | 0.0 | 39.4 |
| Ratio gluconic acid: sodium gluconate | | 2.41 |
| Percent conversion from glucose | 88.0 | 97.3 |

[1] Neutralized sample assayed by polarimeter.
[2] Titration value calculated as gluconic acid.

(b) The fermentation cycle procedures of Example 3 were repeated for a series of 2-cycle runs with varying glucose concentrations whereby the initial fermentations were maintained at pH 6.4 by the addition of sodium hydroxide and the subsequent fermentations were carried out without the addition of any base. As shown by the data in the following Tables IX and X, essentially complete utilization and excellent conversion of the glucose to gluconic acid and sodium gluconate was achieved, with the yields, calculated as sodium gluconate equivalent, being 60.3% and 59.5%. The gluconic acid:sodium gluconate ratios were 1.68 and 1.21, respectively. The final fermentation medium in each case contained the gluconic acid and sodium gluconate completely in solution and was processed by filtration at room temperature to give a clear light colored filtrate which remained clear on standing.

TABLE IX

| Fermentation Cycles | 1 | 2 |
|---|---|---|
| Initial percent glucose | 27.7 | 30.0 |
| pH control | Yes | No |
| Fermentation time, hours | 23 | 45 |
| Percent residual glucose | 0.23 | 0.0 |
| Final pH | 6.4 | 3.4 |
| Percent sodium gluconate equivalent [1] | 27.4 | 60.3 |
| Percent gluconic acid [2] | 0.0 | 35.4 |
| Ratio gluconic acid: sodium gluconate | | 1.68 |
| Percent conversion from glucose | 94.0 | 99.0 |

[1] Neutralized sample assayed by polarimeter.
[2] Titration value calculated as gluconic acid.

TABLE X

| Fermentation Cycles | 1 | 2 |
|---|---|---|
| Initial percent glucose | 34.3 | 26.0 |
| pH control | Yes | No |
| Fermentation time, hours | 35 | 23 |
| Percent residual glucose | 1.7 | 0.0 |
| Final pH | 6.4 | 3.45 |
| Percent sodium gluconate equivalent [1] | 31.9 | 59.5 |
| Percent gluconic acid [2] | 0.0 | 30.7 |
| Ratio gluconic acid: sodium gluconate | | 1.21 |
| Percent conversion from glucose | 94.5 | 98.5 |

[1] Neutralized sample assayed by polarimeter.
[2] Titration value calculated as gluconic acid.

Example 5

The final fermentation medium usually contains small amounts of sulfate, phosphate, oxalate, etc. anions which are desirably removed, and this can be conveniently accomplished by treating the medium or solution with small amounts of calcium carbonate, calcium hydroxide, or the like to precipitate the anions as insoluble salts.

(a) The final solution from a fermentation carried out according to the general procedure of Example 4 and containing 40.0% gluconic acid and 62.8% sodium gluconate equivalent (gluconic acid:sodium gluconate ratio=2.17) tested positive for sulfate, phosphate, oxalate, etc. It was slurried with calcium carbonate (1%) and diatomaceous earth (2%) and filtered on a wet diatomaceous earth pre-coated filter. The clear filtrate, diluted by water from the pre-coat filter, contained 36.3% gluconic acid and 60.4% sodium gluconate equivalent (gluconic acid:sodium gluconate ratio=1.81) and tested negative for sulfate, phosphate, oxalate, etc.

(b) Final solution from a fermentation carried out according to the general procedure of Example 4 and containing 35.0% gluconic acid and 58.8% sodium gluconate equivalent (gluconic acid:sodium gluconate ratio=1.76) tested positive for sulfate, phosphate, oxalate, etc. It was slurried with calcium hydroxide (0.74%) and diatomaceous earth (1%) and filtered on a wet diatomaceous earth pre-coated filter. The clear filtrate, diluted by wash and the water from the pre-coat filter, contained 25.7% gluconic acid and 48.5% sodium gluconate equivalent (gluconic acid:sodium gluconate ratio=1.29) and tested negative for sulfate, phosphate, oxalate, etc.

Example 6

(a) Clear filtrate from a fermentation carried out and processed according to Examples 4 and 5 containing 34.4% gluconic acid and 59.1% sodium gluconate equivalent (gluconic acid:sodium gluconate ratio=1.65) was neutralized to pH 7.5 with 50% by weight aqueous sodium hydroxide and the resultant mixture dried on an atmospheric double drum rotary drier (60 lbs. per sq. inch steam pessure). An off-white soduim gluconate solid of 98.4% purity was obtained.

(b) Clear filtrate from a fermentation carried out and processed according to Examples 4 and 5 containing 26.1% gluconic acid and 58.0% sodium gluconate equivalent (gluconic acid:sodium gluconate ratio=0.90) was neutralized to pH 7.5 with 50% by weight aqueous sodium hydroxide and the resultant mixture dried on an atmospheric double drum rotary drier (60 lbs. sq. inch steam pressure). An off-white sodium gluconate solid of 98.4% purity was obtained.

(c) Clear filtrate from a fermentation carried out and processed according to Examples 4 and 5 and containing 36.3% gluconic acid and 60.4% sodium gluconate equivalent (gluconic acid:sodium gluconate ratio=1.81) was concentrated in vacuo to 91.6% sodium gluconate equivalent. The concentrate at this point was sparkling clear and remained clear at room temperature. The clear concentrate was then neutralized to pH 7.4 with 50% by weight sodium hydroxide and the resultant sodium gluconate crystalline slurry dried on an atmospheric double drum rotary drier (60 lbs. per sq. inch steam pressure). An off-white sodium gluconate solid of 98.3% purity was obtained.

(d) Clear filtrate from a fermentation carried out and processed according to Example 4 and containing 23.9% gluconic acid and 60.7% sodium gluconate equivalent gluconic acid:sodium gluconate ratio=0.70) was concentrated in vacuo to 89% sodium glucconate equivalent. The concentrate at this point was sparkling clear and remained clear at room temperature. The clear concentrate was then neutralized to pH 7.2–7.3 with 50% by weight sodium hydroxide and the resultant sodium gluconate crystalline slurry dried on an atmospheric double drum rotary drier (60–65 lbs. per sq. inch steam pressure). An off-white sodium gluconate solid of 97.0% purity was obtained.

Example 7

Liquid compositions of gluconic acid and gluconic acid plus gluconates were prepared by formulation and from fermentation processed filtrates according to the schedule shown in the following Table XI. These compositions were concentrated in vacuo to 90% by weight solid and diluted to the indicated concentration levels with water. The diluted solutions were then stored at 5°–7° C. (41°–45° F.) and examined periodically for evidence of crystallization. The data obtained are shown in the following Tables XII

TABLE XI

| Code | Composition | Prepared from— | Ratio gluconic acid: gluconate salt | Refer to— |
|---|---|---|---|---|
| A | Gluconic acid | Gluconic acid | | Table XII. |
| B | Gluconic acid, sodium gluconate | Gluconic acid, sodium gluconate | 4 | Table XIII. |
| C | do | do | 3 | Table XIV. |
| D | do | do | 2 | Table XV. |
| E | do | do | 1.33 | Table XVI. |
| F | do | do | 1 | Table XVII. |
| G | do | do | 0.67 | Table XVIII. |
| H | do | Filtrate from a fermentation carried out and processed according to Examples 4 and 5. | 1.64 | Table XIX. |
| I | do | do | 0.91 | Table XX. |
| J | do | Gluconic acid, sodium hydroxide | 2 | Table XXI. |
| K | Gluconic acid, potassium gluconate | Gluconic acid, potassium hydroxide | 2 | Table XXII. |
| L | Gluconic acid, ammonium gluconate | Gluconic acid, ammonium hydroxide | 2 | Table XXIII. |
| M | Gluconic acid, sodium gluconate, ammonium gluconate | Gluconic acid, sodium gluconate, ammonium hydroxide. | 0.67 | Table XXIV. |
| N | Gluconic acid, sodium gluconate, potassium gluconate, ammonium gluconate. | Gluconic acid, sodium gluconate, potassium hydroxide, ammonium hydroxide. | 0.67 | Table XXV. | to XXV. As indicated by these data, the gluconic acid plus gluconate liquid compositions, with the exception of the gluconic acid plus sodium gluconate 0.67 ratio composition, were essentially unaffected under the storage conditions. In contrast, the gluconic acid liquid composition was not soluble over a wide concentration range. Further, the gluconic acid plus mixed gluconate compositions, as for example, gluconic acid plus sodium gluconate plus ammonium gluconate and gluconic acid plus sodium gluconate plus potassium gluconate plus ammonium gluconate, at the equivalent 0.67 ratio composition, were completely soluble at the concentration levels at which the gluconic acid plus sodium gluconate 0.67 ratio composition was not soluble.

In Tables XII and XXI, inclusive, the concentrations in the left-hand columns are weight of solids calculated as sodium gluconate per total weight of the solution. The symbols have the following meanings:

L = Clear liquid solution
T = Trace crystallization
C = Crystallization
S = Solution solidified

TABLE XII

| Composition A | Observations after indicated days at 5°–7° C. | | | | | | |
|---|---|---|---|---|---|---|---|
| | 0 | 5 | 10 | 15 | 20 | 30 | 40 |
| Concentration, percent: | | | | | | | |
| 50 | L | L | L | L | L | L | L |
| 55 | L | L | L | L | L | L | L |
| 60 | L | L | L | L | L | L | L |
| 65 | L | L | L | L | L | L | L |
| 67 | L | L | L | L | L | L | T |
| 75 | L | C | S | S | S | S | S |
| 80 | L | S | S | S | S | S | S |
| 85 | L | S | S | S | S | S | S |
| 90 | L | S | S | S | S | S | S |

TABLE XIII

| Composition B | Observations after indicated days at 5°–7° C. | | | | | | |
|---|---|---|---|---|---|---|---|
| | 0 | 5 | 10 | 15 | 20 | 30 | 40 |
| Concentration, percent: | | | | | | | |
| 50 | L | L | L | L | L | L | L |
| 55 | L | L | L | L | L | L | L |
| 60 | L | L | L | L | L | L | L |
| 65 | L | L | L | L | L | L | L |
| 70 | L | L | L | L | L | L | L |
| 75 | L | L | L | L | L | L | L |
| 80 | L | L | L | L | L | L | L |
| 85 | L | L | L | L | T | S | S |
| 90 | L | L | L | L | L | L | L |

TABLE XIV

| Composition C | Observations after indicated days at 5°–7° C. | | | | | | |
|---|---|---|---|---|---|---|---|
| | 0 | 5 | 10 | 15 | 20 | 30 | 40 |
| Concentration, percent: | | | | | | | |
| 50 | L | L | L | L | L | L | L |
| 55 | L | L | L | L | L | L | L |
| 60 | L | L | L | L | L | L | L |
| 65 | L | L | L | L | L | L | L |
| 70 | L | L | L | L | L | L | L |
| 75 | L | L | L | L | L | L | L |
| 80 | L | L | L | L | L | L | L |
| 85 | L | L | L | L | L | L | L |
| 90 | L | L | L | L | L | L | L |

TABLE XV

| Composition D | Observations after indicated days at 5°–7° C. | | | | | | |
|---|---|---|---|---|---|---|---|
| | 0 | 5 | 10 | 15 | 20 | 30 | 40 |
| Concentration, percent: | | | | | | | |
| 50 | L | L | L | L | L | L | L |
| 55 | L | L | L | L | L | L | L |
| 60 | L | L | L | L | L | L | L |
| 65 | L | L | L | L | L | L | L |
| 70 | L | L | L | L | L | L | L |
| 75 | L | L | L | L | L | L | L |
| 80 | L | L | L | L | L | L | L |
| 85 | L | L | L | L | L | L | L |
| 90 | L | L | L | L | L | L | L |

TABLE XVI

| Composition E | Observations after indicated days at 5°–7° C. | | | | | | |
|---|---|---|---|---|---|---|---|
| | 0 | 5 | 10 | 15 | 20 | 30 | 40 |
| Concentration, percent: | | | | | | | |
| 50 | L | L | L | L | L | L | L |
| 55 | L | L | L | L | L | L | L |
| 60 | L | L | L | L | L | L | L |
| 65 | L | L | L | L | L | L | L |
| 70 | L | L | L | L | L | L | L |
| 75 | L | L | L | L | L | L | L |
| 80 | L | L | L | L | L | L | L |
| 85 | L | L | L | L | L | L | L |
| 90 | L | L | L | L | L | L | L |

TABLE XVII

| Composition F | Observations after indicated days at 5°–7° C. | | | | | | |
|---|---|---|---|---|---|---|---|
| | 0 | 5 | 10 | 15 | 20 | 30 | 40 |
| Concentration, percent: | | | | | | | |
| 50 | L | L | L | L | L | L | L |
| 55 | L | L | L | L | L | L | L |
| 60 | L | L | L | L | L | L | L |
| 65 | L | L | L | L | L | L | L |
| 70 | L | L | L | L | L | L | L |
| 75 | L | L | L | L | L | L | L |
| 80 | L | L | L | L | L | L | L |
| 85 | L | L | L | L | L | L | L |
| 90 | L | L | L | L | L | L | L |

TABLE XVIII

| Composition G | Observations after indicated days at 5°–7° C. | | | | | | |
|---|---|---|---|---|---|---|---|
| | 0 | 5 | 10 | 15 | 20 | 30 | 40 |
| Concentration, percent: | | | | | | | |
| 50 | L | L | L | L | L | L | L |
| 55 | L | L | L | L | L | L | L |
| 60 | L | L | L | L | L | L | L |
| 65 | L | L | L | L | T | C | S |
| 70 | L | S | S | S | S | S | S |
| 75 | L | S | S | S | S | S | S |
| 80 | L | S | S | S | S | S | S |

TABLE XIX

| Composition H | Observations after indicated days at 5°–7° C. | | | | | |
|---|---|---|---|---|---|---|
| | 0 | 5 | 10 | 15 | 20 | 30 |
| Concentration, percent: | | | | | | |
| 50 | L | L | L | L | L | L |
| 55 | L | L | L | L | L | L |
| 60 | L | L | L | L | L | L |
| 65 | L | L | L | L | L | L |
| 70 | L | L | L | L | L | L |
| 75 | L | L | L | L | L | L |
| 80 | L | L | L | L | L | L |
| 85 | L | L | L | L | L | L |
| 90 | L | L | L | L | L | L |

TABLE XX

| Composition I | Observations after indicated days at 5°–7° C. | | | | | |
|---|---|---|---|---|---|---|
| | 0 | 5 | 10 | 15 | 20 | 30 |
| Concentration, percent: | | | | | | |
| 50 | L | L | L | L | L | L |
| 55 | L | L | L | L | L | L |
| 60 | L | L | L | L | L | L |
| 65 | L | L | L | L | L | L |
| 70 | L | L | L | L | L | L |
| 75 | L | L | L | L | L | S |
| 80 | L | L | L | L | L | T |
| 85 | L | L | L | L | L | T |
| 90 | L | L | L | L | L | T |

TABLE XXI

| Composition J | Observations after indicated days at 5°–7° C. | | | | | |
|---|---|---|---|---|---|---|
| | 0 | 5 | 10 | 15 | 20 | 30 |
| Concentration, percent: | | | | | | |
| 50 | L | L | L | L | L | L |
| 55 | L | L | L | L | L | L |
| 60 | L | L | L | L | L | L |
| 65 | L | L | L | L | L | L |
| 70 | L | L | L | L | L | L |
| 75 | L | L | L | L | L | L |
| 80 | L | L | L | L | L | L |
| 85 | L | L | L | L | L | L |
| 90 | L | L | L | L | L | L |

TABLE XXII

| Composition K | Observations after indicated days at 5°-7° C. | | | | | |
|---|---|---|---|---|---|---|
| | 0 | 5 | 10 | 15 | 20 | 30 |
| Concentration, percent:[1] | | | | | | |
| 50 | L | L | L | L | L | L |
| 55 | L | L | L | L | L | L |
| 60 | L | L | L | L | L | L |
| 65 | L | L | L | L | L | L |
| 70 | L | L | L | L | L | L |
| 75 | L | L | L | L | L | L |
| 80 | L | L | L | L | L | L |
| 85 | L | L | L | L | L | L |
| 90 | L | L | L | L | L | L |

[1] As potassium gluconate equivalent.

TABLE XXIII

| Composition L | Observations after indicated days at 5°-7° C. | | | | | |
|---|---|---|---|---|---|---|
| | 0 | 5 | 10 | 15 | 20 | 30 |
| Concentration, percent:[1] | | | | | | |
| 50 | L | L | L | L | L | L |
| 55 | L | L | L | L | L | L |
| 60 | L | L | L | L | L | L |
| 65 | L | L | L | L | L | L |
| 70 | L | L | L | L | L | L |
| 75 | L | L | L | L | L | L |
| 80 | L | L | L | L | L | L |
| 85 | L | L | L | L | L | L |
| 90 | L | L | L | L | L | L |

[1] As ammonium gluconate equivalent.

TABLE XXIV

| Composition M | Observations after indicated days at 5°-7° C. | | | | | |
|---|---|---|---|---|---|---|
| | 0 | 5 | 10 | 15 | 20 | 30 |
| Concentration, percent:[1] | | | | | | |
| 50 | L | L | L | L | L | L |
| 55 | L | L | L | L | L | L |
| 60 | L | L | L | L | L | L |
| 65 | L | L | L | L | L | L |
| 70 | L | L | L | L | L | L |
| 75 | L | L | L | L | L | C |
| 80 | L | L | L | L | L | T |
| 85 | L | L | L | L | L | T |
| 90 | L | L | L | L | L | T |

[1] As average sodium gluconate plus ammonium gluconate equivalent.

TABLE XXV

| Composition N | Observations after indicated days at 5°-7° C. | | | | | |
|---|---|---|---|---|---|---|
| | 0 | 5 | 10 | 15 | 20 | 30 |
| Concentration, percent:[1] | | | | | | |
| 50 | L | L | L | L | L | L |
| 55 | L | L | L | L | L | L |
| 60 | L | L | L | L | L | L |
| 65 | L | L | L | L | L | L |
| 70 | L | L | L | L | L | L |
| 75 | L | L | L | L | L | L |
| 80 | L | L | L | L | L | L |
| 85 | L | L | L | L | L | L |
| 90 | L | L | L | L | L | L |

[1] As average sodium gluconate plus potassium gluconate plus ammonium gluconate equivalent.

Example 8

(a) Filtrate from a fermentation carried out and processed according to Examples 4 and 5 and containing 36.3% gluconic acid and 60.4% sodium gluconate equivalent (gluconic acid: sodium gluconate ratio=1.81) was passed through a 5.5 cm. diameter glass column containing 1 liter of Dowex 50–x–10 resin in the hydrogen form until the effluent tested positive for sodium. At this point, 2500 ml. of filtrate solution had been fed to the column (followed by a water wash), and it was found that the gluconic acid content in the total effluent had increased from 906 grams to 1284 grams, of which 996 grams of gluconic acid were recovered sodium-free in the first effluent cut. This recovered sodium-free effluent solution was very light colored and contained the gluconic acid in essentially 100% purity.

(b) To show the advantage of using low sodium content gluconic acid—gluconate mixtures for the recovery of gluconic acid, the resin purification was repeated using a mixture containing a higher concentration of sodium. In this example, filtrate from a fermentation carried out and processed according to Examples 4 and 5 and containing 26.1% gluconic acid and 58.0% sodium gluconate equivalent (gluconic acid:sodium gluconate ratio=0.90) was passed through a 5.5 cm. diameter glass column containing 1 liter of Dowex 50–x–10 resin in the hydrogen form until the effluent tested positive for sodium. At this point, 1850 ml. of filtrate solution had been fed to the column (followed by a water wash), and it was found that the gluconic acid content in the total effluent had increased from 483 grams to 889 grams, of which 660 grams of gluconic acid were recovered sodium-free in the first effluent cut. This recovered sodium-free effluent solution was very light colored and contained the gluconic acid in essentially 100% purity.

Example 9

Clear filtrate from a fermentation carried out and processed according to Examples 4 and 8 and containing 41.6% gluconic acid tested positive for sulfate, phosphate, oxalate, etc. It was slurried with calcium carbonate (0.7%) and diatomaceous earth (1%) and filtered. The clear filtrate contained 42.2% gluconic acid and tested negative for sulfate, phosphate, oxalate, etc.

Example 10

The sequestering power of the sodium gluconate dry product and gluconic acid-sodium gluconate liquid product toward calcium ions was measured by the Zussman method (Soap Sanit. Chemicals, 24, 57 (1948)) as described and discussed by Mehltretter et al. (Ind Eng. Chem., 45, 2782 (1953)). In addition, the sequestering power of these compositions toward iron was measured by the method described and discussed by Mehltretter.

(a) A sodium gluconate dry product produced according to Examples 4 and 6 and having a purity of 96.6% sequested 16.1 grams of calcium and 319 grams of iron per 100 grams of sodium gluconate following the procedures described above.

(b) A gluconic acid-sodium gluconate liquid product containing 62.2% by weight sodium gluconate equivalent (gluconic acid:sodium gluconate ratio=0.67) produced according to Example 4 sequestered 16 grams of calcium and 319 grams of iron per 100 grams of sodium gluconate equivalent following the procedures described above.

Example 11

The gluconic acid-sodium gluconate liquid product produced according to Example 4 and containing 60.7% by weight sodium gluconate equivalent (gluconic acid-sodium gluconate ratio=0.84) was used in a commercial caustic bottle washing operation. The water source for the soaker compartments had a hardness (as $CaCO_3$) of approximately 350 p.p.m., and a 3–5% caustic solution was used for the bottle washing operation. The gluconic acid-sodium gluconate liquid product was added to the caustic solution at the rate of 8 pounds (4.85 pounds of sodium gluconate equivalent) per 100 pounds of caustic solids. Excellent bottle washing results were obtained with efficient removal of the aluminum labels and the bottles after treatment showed no haze or rust spots.

Example 12

Sodium gluconate dry product (0.5 pound, 96% pure), produced according to Examples 4 and 6, and caustic soda (1.5 pounds) were added to 1 gallon water and the mixture heated to boiling. A rusted iron panel strip (2" x 3¾") cut from a rusted carbon steel sheet was half immersed in the boiling solution. After 5 minutes, the iron strip was removed, rinsed with water and the treated half of the iron strip compared to the untreated portion. The procedure was repeated using pieces cut from different portions of the rusted iron sheet. Excellent rust removal was obtained.

From the foregoing description and examples it will be seen that the invention provides a very versatile and flexible process for making aldonic acid and aldonates, more particularly gluconic acid and gluconates and mixtures thereof, from aldoses such as glucose. Other aldonic acids and aldonates are arabonic acid, mannonic acid, gulonic acid, galactonic acid and talonic acid and their salts.

The invention does not reside in the particular microorganism used in the fermentation. The organism should be one capable of producing an aldose oxidase, e.g., glucose oxidase, under agitated submerged aerobic conditions. Fungal organisms are preferred, especially *Aspergillus niger*. Other examples are *Penicillium luteum* and acid producing bacteria such as those of the genus Acetobacter. Nor does the invention reside in the particular conditions except that conditions which promote cell growth of the organisms should be used including aeration with air and/or oxygen under submerged conditions, at atmospheric or superatmospheric pressures, in the presence of nitrogen and nutrient minerals such as magnesium, potassium and phosphate, and temperatures usually within the range of 25° C. to 40° C. As previously indicated, however, pH of the medium is an important factor in the early stages of fermentation and a pH of 5 to 7 is desirable in this stage. The time period used is normally sufficient to convert nearly all of the aldose to the aldonic acid or aldonate. A preferred temperature is about 34° C.

The isolated crude or purified aldose oxidase enzyme system, or alternatively the microbial cells containing the aldose oxidase enzyme system, can also be used to produce the aldonic acid and aldonates as herein described.

The preferred products consist of mixtures in which the acid:salt weight ratio is within the range of 0.2:1 to 4:1. In the case of gluconic acid-sodium gluconate mixtures, the preferred products are aqueous solutions having a dissolved solids content in excess of 50% but usually not more than 90% by weight, with a gluconic acid: sodium gluconate weight ratio of 0.5:1 to 3:1. Mixtures of gluconic acid and other gluconates would have similar ratios.

Control of pH during fermentation is effected by adding an alkali or base, e.g., sodium hydroxide, potassium hydroxide, or ammonia, continuously or intermittently, preferably as concentrated solutions in water. The amount of alkali or base added preferably is sufficient to convert at least one-third of the weight of aldonic acid formed to an aldonate. Thereafter, the process can be operated with or without pH control, depending upon the ratio of aldonic acid to aldonate desired in the final product.

The microorganism utilizes small amounts of the aldose for cell growth and the formation of the aldose oxidase. After cell growth has been established the additional aldose can be added as a solid or in dissolved state continuously or intermittently. The addition of aldose in solid form is preferred because it does not substantially alter the volume of the medium.

It will be seen that the process affords a number of variations. Thus, glucose and sodium hydroxide can be added to the fermentation medium in proportions such that the final product is essentially a solution of sodium gluconate which is filtered to remove mycelium and other solids. The filtrate containing the sodium gluconate can be used as such or the sodium gluconate can be recovered therefrom. Alternatively, the fermentation medium can also be treated with small amounts of a calcium or barium salt which will form water insoluble phosphates, oxalates and sulfates, and thereafter filtered to remove the phosphates, oxalates and sulfates in the filter cake. The resultant filtrate contains the sodium gluconate without sulfate, oxalate and phosphate impurities.

When the process is carried out to produce a mixture of aldonic acid and aldonate, the mixture can be sold and used as such, or it can be neutralized to form an aldonate solution, which can be used as such or evaporated to produce a solid salt of 96–98% purity. The aldonate can also be crystallized from solution to produce a product of 100% purity.

The mixtures of aldonic acid and aldonate in aqueous solution normally have a pH less than 5. Thus, the gluconic acid-gluconate mixture can have a weight ratio of gluconic acid to gluconate of 0.06:1 to 44:1. At a ratio of 44:1 the pH is approximately 1.7.

Another modification is to produce a mixture of aldonate and aldonic acid in the manner previously described, e.g., a 60% solution (60 grams per 100 cc. of solution) of gluconic acid and sodium gluconate and pass said solution through a cation resin in hydrogen form (e.g., Dowex 50, Nalcite HCR, or other sulfonated styrene-divinylbenzene ion exchange resin in the hydrogen form) thereby removing the sodium ions and converting the sodium gluconate to glucoic acid which can be used as such or converted to glucono-delta-lactone.

In another modification a mixture of aldonic acid and aldonate is prepared as previously described and is passed through a dialysis membrane or an electrodialysis cell where the acid, or part of it for example, gluconic acid, is separated from the salt, for example, sodium gluconate, thereby producing a gluconic acid solution and a sodium gluconate solution.

The products in the form of aldonic acid-aldonate mixtures or as the acid or aldonate are useful in cleaning solutions, especially alkaline bottle washing solution, as chelating agents and for many other purposes.

The invention is hereby claimed as follows:

1. A liquid composition having a dissolved solids content of 50% to 90% by weight and consisting essentially of a mixture of gluconic acid and gluconate in water, said composition having a weight ratio of gluconic acid to gluconate in an amount sufficient to enhance stability of the total composition and within the range of 0.06:1 to 44:1, said gluconate being from the class consisting of sodium gluconate, potassium gluconate, and ammonium gluconate.

2. A liquid composition having a dissolved solids content of 50% to 90% by weight and consisting essentially of a mixture of gluconic acid and sodium gluconate in water, said composition containing gluconic acid and sodium gluconate in an amount sufficient to enhance stability of the total composition and in a weight ratio within the range of 0.9:1 to 4:1.

3. A liquid composition having a dissolved solids content of 50% to 90% by weight and consisting essentially of a mixture of gluconic acid and ammonium gluconate in water, said composition containing gluconic acid and ammonium gluconate in an amount sufficient to enhance stability of the total composition and in a weight ratio within the range of 0.2:1 to 4:1.

4. A liquid composition having a dissolved solids content of 50% to 90% by weight and consisting essentially of a mixture of gluconic acid and potassium gluconate in water, said composition containing gluconic acid and potassium gluconate in an amount sufficient to enhance stability of the total composition and in a weight ratio within the range of 0.2:1 to 4:1.

5. A liquid composition having a dissolved solids content of 50% to 90% by weight and consisting essentially of gluconic acid and a mixture of gluconates in water, one of said gluconates being sodium gluconate, and at least one other being from the group consisting of ammonium gluconate and potassium gluconate, the weight ratio of gluconic acid to total gluconate being sufficient to enhance stability of the total composition and within the range of 0.2:1 to 4:1.

6. A liquid composition having a dissolved solids content of 50% to 90% by weight and consisting essentially of gluconic acid and sodium gluconate in water, said composition containing gluconic acid and sodium gluconate in an amount sufficient to enhance stability of the total composition and in a weight ratio within the range of 0.7 to about 2.4.

References Cited

UNITED STATES PATENTS

| | | |
|---|---|---|
| 2,424,049 | 7/1947 | Parker et al. _____ 252—142 |
| 2,584,017 | 1/1952 | Dvorkovitz et al. ____ 252—142 |
| 2,692,187 | 10/1954 | Chester et al. _____ 252—79.4 |
| 3,025,189 | 3/1962 | Arden _____ 252—142 |
| 3,105,822 | 10/1963 | Karabinos et al. |
| 2,351,500 | 6/1944 | Moyer _____ 195—36 |
| 2,602,768 | 7/1952 | Crocker et al. _____ 195—36 |

FOREIGN PATENTS 440,564  12/1935  Great Britain.

OTHER REFERENCES

Mehltretter et al.: Sequestration by Sugar Acids, Industrial Engineering Chem., December 1953, pp. 2782–2784.

LEON D. ROSDOL, *Primary Examiner.*

W. SCHULZ, *Assistant Examiner.*

U.S. Cl. X.R.

134—3, 41; 195—36; 252—1, 79.4, 156, 407